United States Patent
Hedbor et al.

(10) Patent No.: US 9,319,346 B2
(45) Date of Patent: Apr. 19, 2016

(54) WEB ACCESS PERFORMANCE ENHANCEMENT

(71) Applicant: Opera Software ASA, Oslo (NO)

(72) Inventors: Per Hedbor, Mantorp (SE); Johan Schon, Linköping (SE); Markus Johansson, Linköping (SE); Jens Widell, Solna (SE)

(73) Assignee: Opera Software ASA, Oslo (NO)

( * ) Notice: Subject to any disclaimer, the term of this patent is extended or adjusted under 35 U.S.C. 154(b) by 0 days.

(21) Appl. No.: 14/710,412

(22) Filed: May 12, 2015

(65) Prior Publication Data

US 2015/0334041 A1    Nov. 19, 2015

Related U.S. Application Data

(60) Provisional application No. 61/992,761, filed on May 13, 2014.

(51) Int. Cl.
| | |
|---|---|
| *G06F 15/16* | (2006.01) |
| *H04L 12/911* | (2013.01) |
| *H04L 29/06* | (2006.01) |
| *H04L 29/08* | (2006.01) |
| *G06F 17/30* | (2006.01) |

(52) U.S. Cl.
CPC .......... *H04L 47/70* (2013.01); *G06F 17/30902* (2013.01); *H04L 67/02* (2013.01); *H04L 67/42* (2013.01)

(58) Field of Classification Search
USPC ......... 709/203, 217, 219, 223, 224, 230, 231, 709/232, 233; 706/54; 711/125; 726/22
See application file for complete search history.

(56) References Cited

U.S. PATENT DOCUMENTS

| | | | | |
|---|---|---|---|---|
| 7,941,609 | B2 * | 5/2011 | Almog ................. | G06N 99/005 709/217 |
| 8,959,630 | B2 * | 2/2015 | Milener .............. | H04L 67/2847 726/22 |
| 8,984,048 | B1 * | 3/2015 | Maniscalco ............. | G06F 15/16 709/232 |
| 9,037,638 | B1 * | 5/2015 | Lepeska ............ | H04L 29/06047 709/203 |
| 9,106,607 | B1 * | 8/2015 | Lepeska .............. | H04L 67/2847 1/1 |
| 2008/0208789 | A1 * | 8/2008 | Almog ................. | G06N 99/005 706/54 |
| 2009/0100228 | A1 * | 4/2009 | Lepeska ............ | G06F 17/30902 711/125 |
| 2013/0124621 | A1 * | 5/2013 | Lepeska ............ | G06F 17/30902 709/203 |

OTHER PUBLICATIONS

International Search Report and Written Opinion issued in PCT/IB2015/001339 dated Oct. 14, 2015.
T.M. Kroeger et al., "Exploring the Bounds of Web Latency Reduction From Caching and Prefetching", May 5, 1999. Retrieved from http://www.cse.ucsc.edu/-tmk/publications/ideal/.
Xin Chen et al., "Coordinated data prefetching by utilizing reference information at both proxy and web servers", ACM SIGMETRICS Performance Evaluation Review, Sep. 1, 2001, pp. 32-38.
Ramon Caceres et al., "Web Proxy Caching: The Devil is in the Details", Dec. 3, 1998, Retrieved from http://www.kiskeya.net/ramon/work/pubs/wisp98.pdf.

* cited by examiner

(Continued)

Primary Examiner — Quang N Nguyen
(74) Attorney, Agent, or Firm — DLA Piper LLP (US)

(57) ABSTRACT

Systems and methods described herein may provide web access performance enhancement. A proxy server comprising a processor and a database may receive request data associated with a URL and store the request data in the database. The proxy server may receive a request for the URL from a client, identify commonly requested data in the request data, and send the commonly requested data to the client before receiving a request for the commonly requested data from the client.

20 Claims, 9 Drawing Sheets

WEB ACCESS PERFORMANCE ENHANCEMENT

CROSS REFERENCE TO RELATED APPLICATIONS

This application is based on and derives the benefit of U.S. Provisional Patent Application No. 61/992,761, filed on May 13, 2014. The entirety of the above-listed Application is incorporated herein by reference.

DETAILED DESCRIPTION OF SEVERAL EMBODIMENTS

Systems and methods described herein may provide speed and compression enhancements for web access. Performance of compression proxy solutions may be enhanced by predicting what files a user will request and pushing them to a client before they are requested. This may avoid extra round trips from the client through a proxy to a server, thereby increasing speed.

A single web page may include a plurality of files, such as HTML files, image files, audio/video files, etc. When a web browser fetches a page, it may do so over several requests, for example making one request per file included in the page. In high latency networks, such as mobile networks, the time it takes for a request to respond may be a significant part of the time it takes to load a page. Many files may be requested, and in many cases loading is blocked while waiting for a particular resource, such as a JavaScript file.

The systems and methods described herein may include determining which resources to push to optimize the user experience. By recording what network requests other users have made when loading a particular page on the proxy, the systems and methods described herein may predict what part of the page a particular user will load. Thus, the predicted elements may be pushed even before the client requests them.

Systems and methods described herein may comprise one or more computers. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. For example, though the term "server" may appear in the following specification, the disclosed embodiments are not limited to server.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connection). Connections between computers may use any protocols, including connection oriented protocols such as TCP or connectionless protocols such as UDP. Any connection through which at least two computers may exchange data can be the basis of a network.

Figure 1:
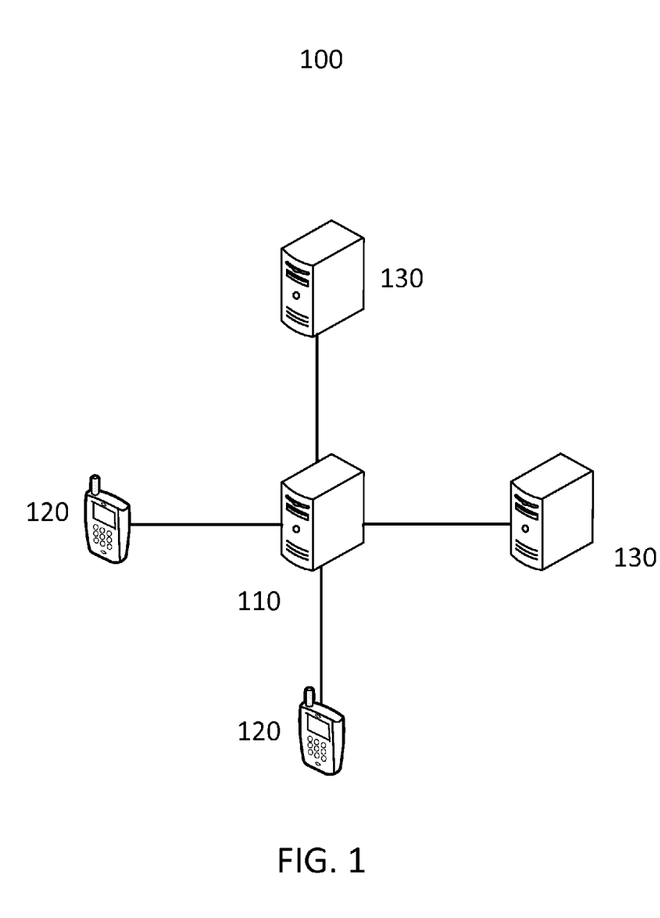
FIG. 1 is a network according to an embodiment of the invention.

FIG. 1 is a network 100 according to an embodiment of the invention. Web browser equipped computers such as mobile devices (e.g., clients 120) may communicate with a proxy server 110 in order to access web content hosted by one or more servers 130. While mobile devices are used as examples, the enhancements provided by the systems and methods described herein may be applied to any browser equipped devices. The clients 120 may communicate with the proxy server 110 via any network, for example a 3G or 4G network or a local area network such as a Wi-Fi network. Communications between the clients 120 and proxy server 110 may use a protocol which allows unrequested data pushing from the proxy server 110 to a client 120, such as the SPDY protocol for example. The proxy server 110 may communicate with the servers 130 via any network, for example the Internet or a private enterprise network. Communications between the proxy server 110 and the servers 130 may use any protocol which allows data transfer between the proxy server 110 and the servers 130. A client 120 may request display of a web page hosted by a server 130. As will be described in greater detail below, the proxy server 110 may receive this request, retrieve web page content from the server 130, and deliver the web page to the client 120. This operation may include predicting what files will be requested by the client 120 as a result of interaction with the website and pushing the files to the client 120 before they are requested.

The proxy server 110 may serve many clients 120 and may record information about what pages the clients 120 request and what inline requests for additional data are made by the clients 120 as a result of the initial page requests. Using this information the proxy server 110 may determine what resources it can request from the servers 130 in advance and push those resources as early as possible to the clients 120. Thus, resources that would have been requested as a result of JavaScript execution on the clients 120 may be pushed in advance, even before the JavaScript has been executed, for example.

In order to determine what resources may be pushed to a client 120, cookies on the client 120 and cookies on the proxy server 110 may be synchronized. Note that cookies may be altered locally on the client 120, for example by JavaScript. Information about the contents of the client 120 browser cache may also be synchronized with the proxy server 110 to ensure that resources that are already in the cache on the client 120 are not pushed. Pushing redundant data may waste bandwidth.

If it turns out that a particular resource pushed to the client 120 was not used by the web page after all, this information may be sent to the proxy server 110 so that the resource can be removed from a list of resources to push in future requests.

As noted above, many elements of a web page may be called by a JavaScript execution. While some web page elements (e.g., HTML page, graphics, etc.) may be easily identified for pushing, elements referred to by a JavaScript execution may not be trivially resolved without executing the JavaScript. JavaScript could be executed on the proxy server 110, but this may cause memory constraint issues, problems with synchronizing execution state between the client 120 and the proxy server 110, and more. Thus, resources in a web page usually fetched by a client 120 may be recorded over time, and this data may be used to speculatively push these common resources to the client 120 prior to client 120 request.

Figure 2:
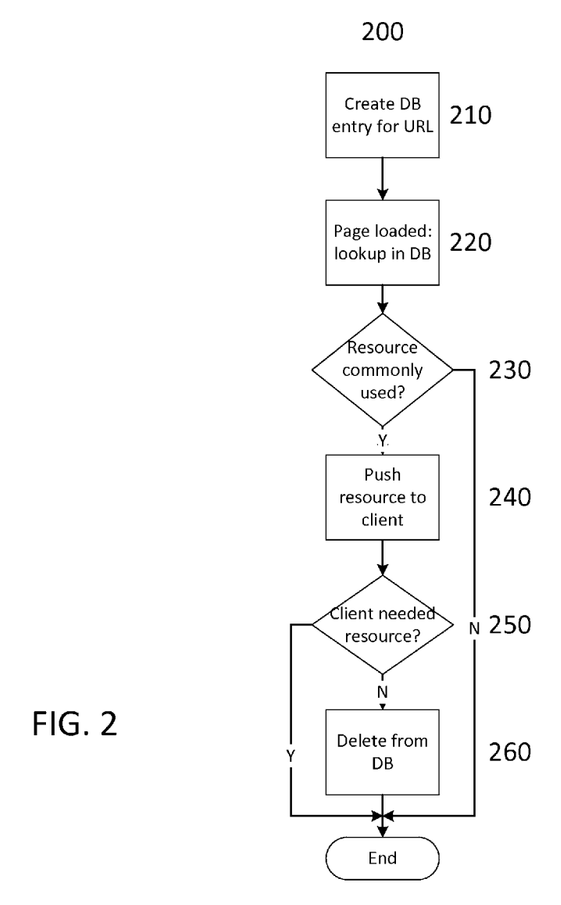
FIG. 2 is a data push process according to an embodiment of the invention.

FIG. 2 is a data push process 200 according to an embodiment of the invention. The proxy server 110 may create an entry in a database for each main URL 210. The entries may include information about what inline URLs were requested by clients 120 for that page and how many times the inline URLs are requested by any client 120. While inline URLs are discussed in this example, this process 200 may be performed for any URL found in a page's document object model (DOM) tree. Note that a URL may represent any data (e.g., HTML, stylesheets, JavaScript elements, multimedia files, etc.). When a page is loaded by a client 120, the proxy server 110 may perform a lookup in the database 220. If the database entry shows that a resource is usually fetched in other page loads of the same page 230, the proxy server 110 may determine that the resource is probably needed by the client 120. Accordingly, the proxy server 110 may preemptively obtain and then push the resource 240. This process 200 may take advantage of the fact that each time a browser issues a request for a URL, the browser may check a local cache for the presence of a valid copy of the URL. If there is a copy in the cache, the copy may be used by the browser without requesting the URL from its remote source. Pushing the resource 240 may place the resource into the browser cache. Therefore, the browser may identify the resource in the cache and load it without sending a request out onto the network 100.

Figure 5:
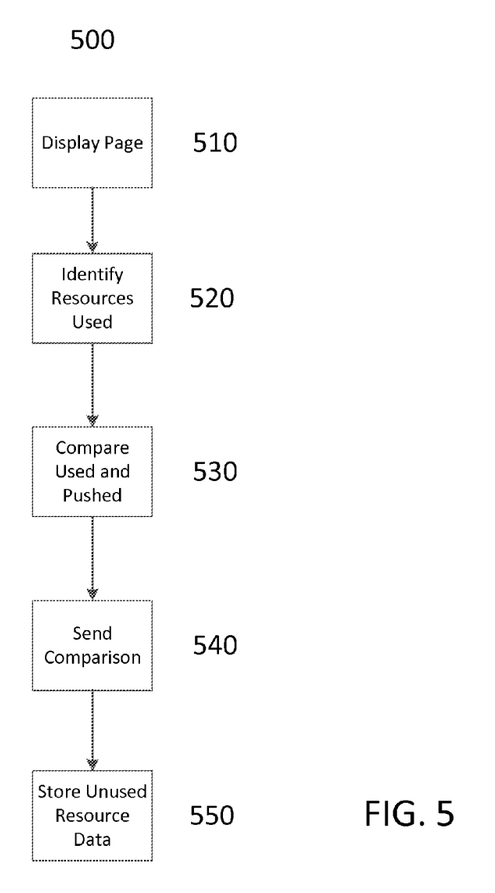
FIG. 5 is a resource evaluation process according to an embodiment of the invention.

If the client 120 did not need the resource after all, the client 120 may send a message to the proxy server 110 containing information that the resource was not needed 250. The proxy server 110 may record that information in the database in order to improve the push accuracy in the next page loads 260. FIG. 5 is a resource evaluation process 500 according to an embodiment of the invention. For example, the client 120 may display a web page 510 by interpreting page description languages (e.g., HTML or CSS) and executing code (e.g., JavaScript) stored in files (e.g., web resources) that are requested from servers 130. Interpretation and execution of code from the aforementioned files may cause the client 120 to request additional web resources from servers 130, which in turn may require further interpretation or code execution. As discussed herein, some or all of these resources (including unrequested resources) may be pushed to the client 120 by the proxy server 110.

The client 120 may record all the resources that were used 520 in the display of the web page. By comparing the list of resources recorded during displaying the page and the list of resources that arrived from the proxy server 110 as pushed resources, the client 120 may create a list of resources that were pushed but not used during the process of displaying the page 530. The client 120 may send a message 540 containing identifiers of the resources that were pushed but not used to the proxy server 110. The proxy server 110 may record the received information about unused resources in a database 550. When the proxy server 110 builds a list for resources to push during a next load of the same page, the identified unused resources may not be considered candidates to be pushed to the client 120.

The proxy server 110 can compress or recompress data served by web server. The proxy server 110 can use cache of the client 120 as a dictionary base for delta encoding. When the proxy server 110 is about to push new resource to the client 120, it can first check whether there exists a similar resource in the cache of the client 120. Similarity metrics can be expressed as a function of filesize, CRC checksum, Rabin's fingerprints, text comparison, VCDIFF or others. If such a resource exists, then the proxy server 110 can send only a difference between cached resource and new resource. The client 120 can decode the difference using the cache as a dictionary base for delta encoding.

Figure 3:
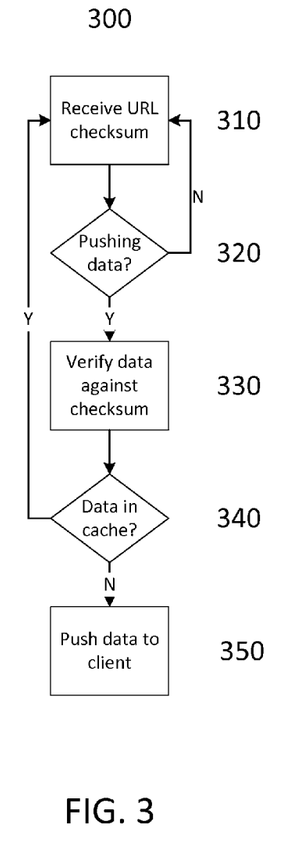
FIG. 3 is a cache synchronization process according to an embodiment of the invention.

FIG. 3 is a cache synchronization process 300 according to an embodiment of the invention. In order to avoid pushing data that is already in the client's 120 cache, information about the contents of the cache may be synchronized from the client 120 to the proxy server 110. On client 120 browser startup, cache data may be sent to the proxy server 110. For example, a 4 byte CRC checksum for each cache URL may be sent to the proxy server 110 in some embodiments. During a browser session, the client 120 may send incremental updates (e.g., by generating 4 byte checksums representing each of the URLs removed or added to the local cache and sending a list of the checksums) to inform the proxy server 110 that the content of the browser cache might have changed in a way that may not be noticeable to the proxy server 110 (e.g. client 120 loaded web resource bypassing the proxy server 110). When the proxy server 110 is about to push an item 320 to the client 120, the proxy server 110 may verify the item against the checksums to see if the client 120 already claims to have the item in its cache 330. If the item is in the cache 340, the item may not be pushed. However, if the item is not in the cache 330, the proxy server 110 may push the item 350.

In some embodiments, the synchronization data on the proxy server 110 may not perfectly represent the client 120 data, since the data is only used to avoid pushing excessive resources. Furthermore, if a resource is not pushed often enough, the client 120 may still request it in the normal way.

FIGS. 4A-4E show a cookie synchronization process 400 according to an embodiment of the invention. A client 120 may store lists of cookies associated with internet domains from which they are received. The list may include domains that ordered the client 120 to store cookies and each of the domains for which cookies were actually set. When the client 120 requests resources from a domain, it may append cookies that were associated with that domain in the past. The proxy server 110 may obtain information about the cookies on the client 120 to help facilitate the data push process 200. This information may be useful in a case when a page requests inline resources from another domain, because the cookies may not be part of the main request, for example. Many web pages include resources from multiple domains. For the proxy server 110 to be able to issue a speculative web request in the name of the client 120 (i.e., based on the processes described above, rather than as a result of an explicit client 120 request), the proxy server 110 may use an up-to-date copy of all the cookies that are stored in the client 120 browser, in case the web request targets different internet domains in addition to a main domain of the requested web page.

Figure 4A:
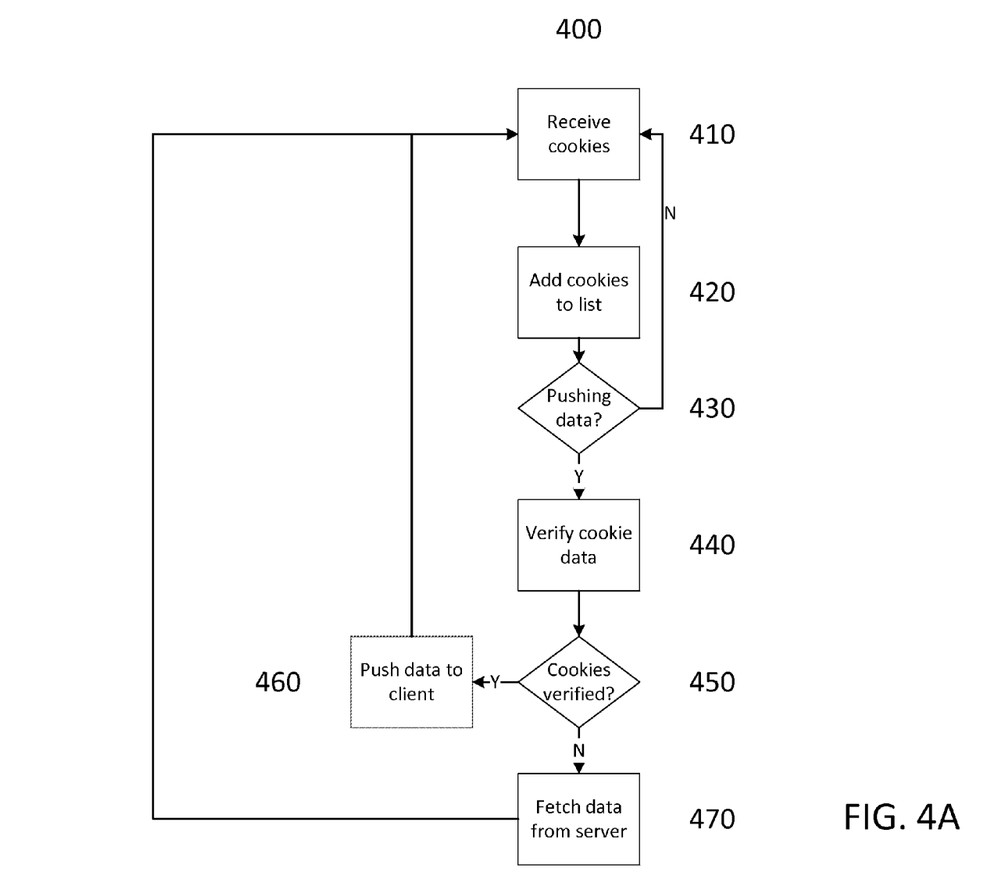
FIGS. 4A-4E are a cookie synchronization process according to an embodiment of the invention.
Figure 4B:
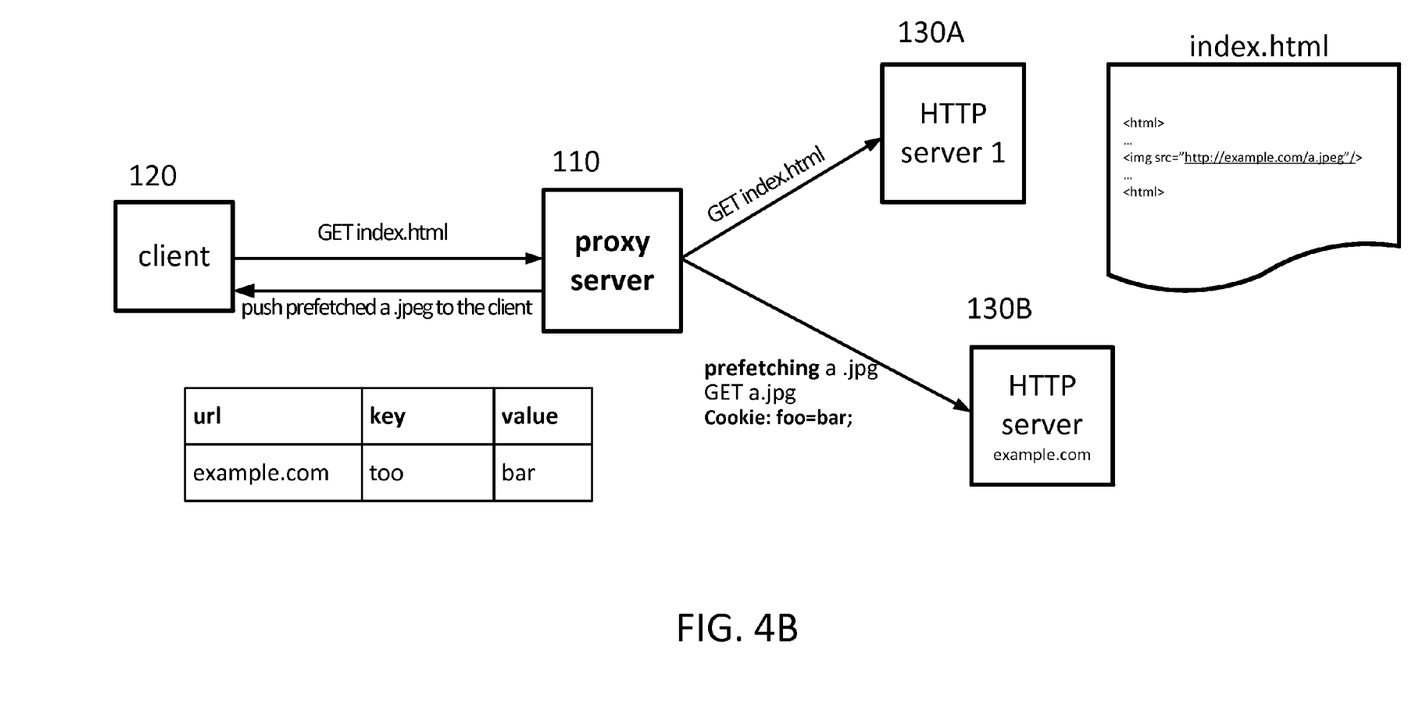
Figure 4C:
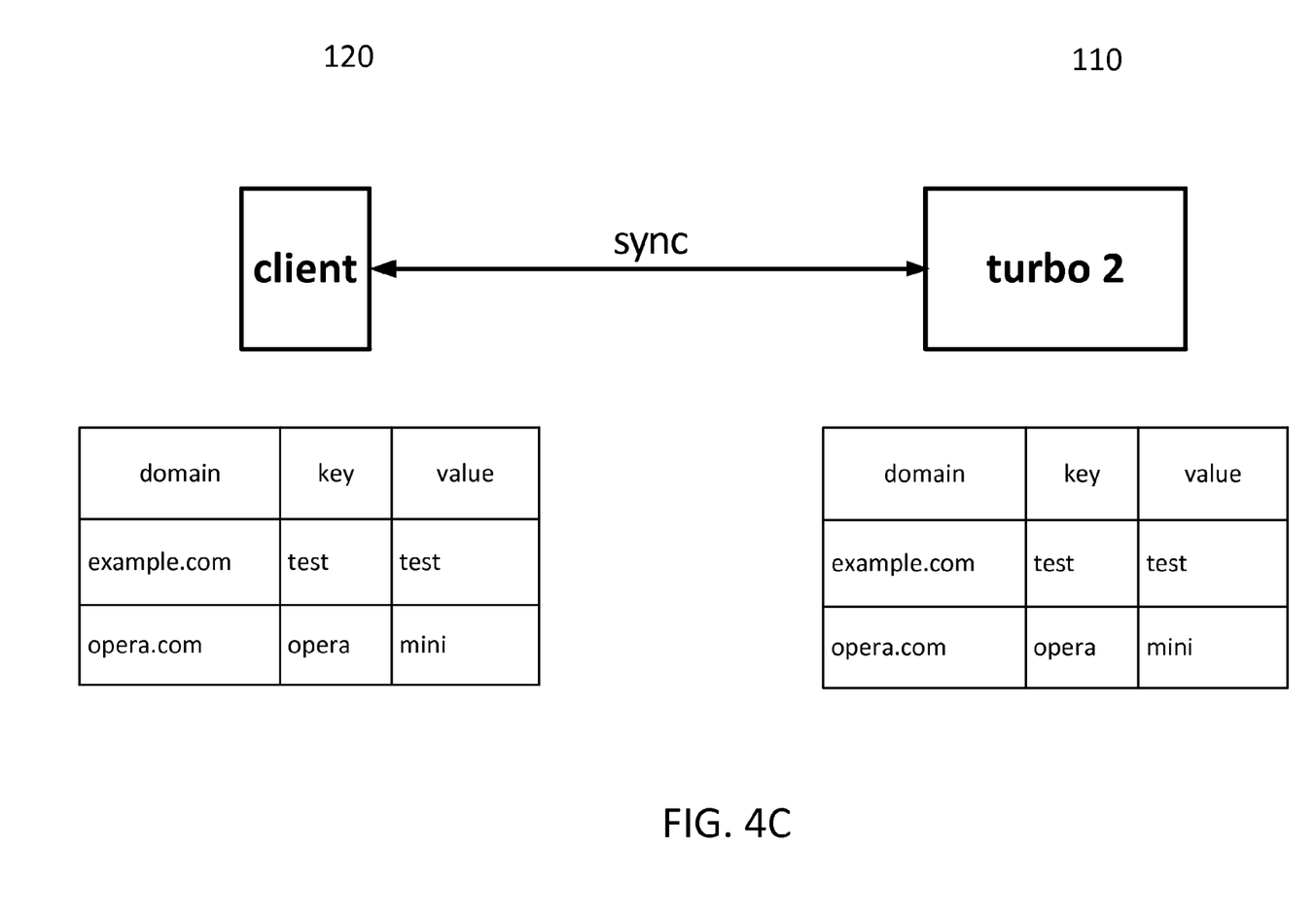
Figure 4D:
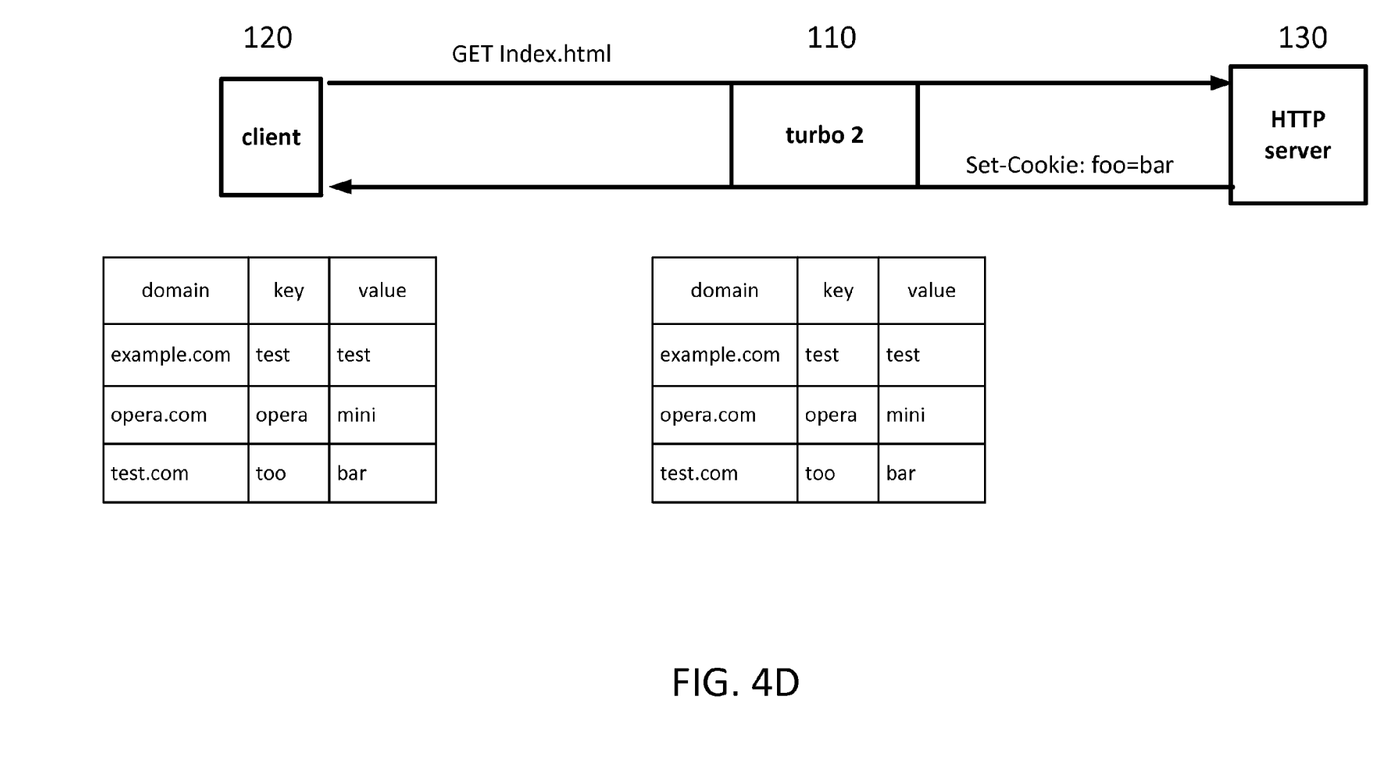
Figure 4E:
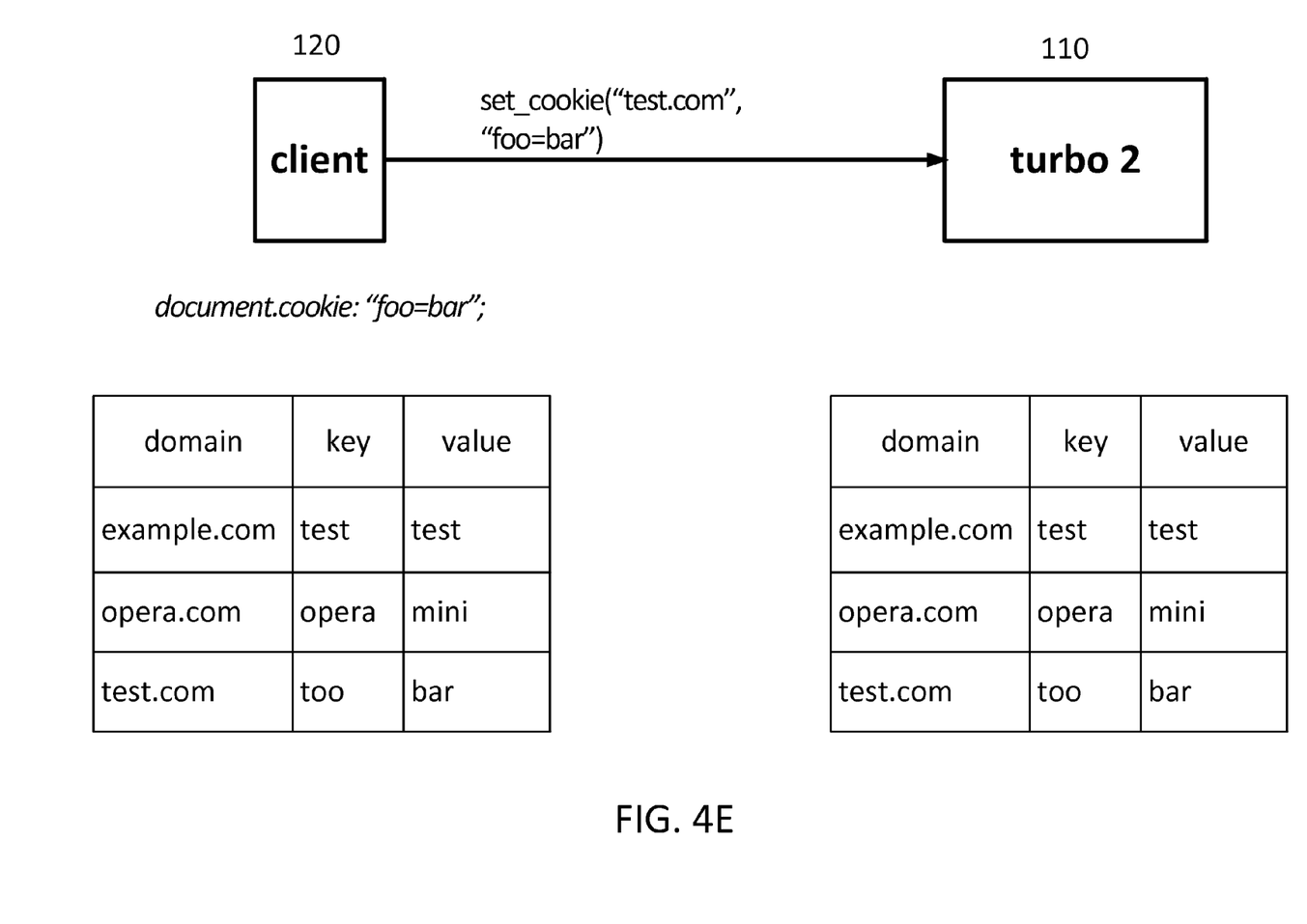

FIG. 4B illustrates an example scenario wherein the proxy server 110 receives a request from the client 120 to fetch a URL from a first server 130A. The request may contain cookies relevant to the domain of the first server 130A. Furthermore, due to the pre-fetching processes described above, the proxy server 110 may decide to request additional resources from the second server 130B, because the proxy server 110 expects the client 120 to need the additional resources. In order to request the additional resources from the second server 130B, the proxy server may use its knowledge about cookies on the client 120 so it can add any cookies relevant to the domain of the second server 130B to the preemptive request to the second server 130B.

On initial connection or on any reconnection, all cookies stored on the client 120 may be synced 410 with the proxy server 110. (On reconnection only the changes may be sent to the proxy server 110.) For example, in FIG. 4C, the cookies stored on the client 120 from example.com and opera.com may be sent to the proxy server 110.

When a server 130 sets a cookie (e.g., with Set-Cookie HTTP header), the proxy server 110 may add this cookie to the client cookies list 420 stored on the proxy server 110. For example, in FIG. 4D, a get request is sent from the client 120 to the proxy server 110 and from the proxy server 110 to the server 130. The server 130 may respond with a set_cookie command. This command may be received by the proxy server 110 and sent from the proxy server 110 to the client 120. Thus, both the proxy server 110 and client 120 may set the same cookie (e.g., from test.com as shown).

When a client 120 sets cookies with JavaScript, it may send a command, for example a set_cookie command, to the proxy server 110 so the proxy server 110 knows about cookies added without making HTTP requests and may add them to the list 420. For example, in FIG. 4E the client 120 generates a set_cookie command locally (e.g., by executing a JavaScript). The client 120 may send this command to the proxy server 110, so the proxy server 110 may set the same cookie (e.g., for test.com as shown).

When the proxy server 110 pushes content 430 to the client 120, it may include cookie information. For example, the proxy server 110 may send an x-ov header which contains checksum of cookies. The client 120 may use this header to verify if correct cookies were used when prefetching 440. If the verification succeeds 450, the client 120 may accept the pushed data 460 If the verification fails 450, the client may discard the stream 470 and fetch the resource directly from the server 130.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
   receiving, with a proxy server comprising a processor and a database, request data associated with a URL;
   storing, with the proxy server, the request data in the database;
   receiving, with the proxy server, a request for the URL from a client;
   identifying, with the proxy server, commonly requested data in the request data;
   receiving, with the proxy server, client cache data from the client;
   determining, with the proxy server, whether the commonly requested data is in the client cache data;
   when the commonly requested data is not in the client cache data, sending, with the proxy server, the commonly requested data to the client before receiving a request for the commonly requested data from the client;
   receiving, with the proxy server, an indication from the client that the commonly requested data was not needed; and
   storing, with the proxy server, the indication in the database so that the commonly requested data will no longer be sent in response to a request for the URL.

2. The method of claim 1, wherein the commonly requested data comprises data requested as a result of a script execution by the client.

3. The method of claim 2, wherein the script is a JavaScript element.

4. The method of claim 1, wherein the commonly requested data is associated with a different URL from the URL.

5. The method of claim 1, further comprising synchronizing, with the proxy server, a client cache with a proxy server cache.

6. The method of claim 5, wherein the synchronizing comprises:
   receiving, with the proxy server, client cache data from the client; and
   storing, with the proxy server, the client cache data in the database.

7. The method of claim 1, further comprising synchronizing, with the proxy server, a client cookie with a proxy server cookie.

8. The method of claim 7, wherein the synchronizing comprises:
   receiving, with the proxy server, client cookie data from the client; and
   storing, with the proxy server, the client cookie data in the database.

9. The method of claim 7, further comprising:
   verifying that the client cookie data matches the server cookie data; and
   when the client cookie data does not match the server cookie data, fetching the commonly requested data directly from a web server.

10. The method of claim 5, further comprising compression and delta encoding of request results with the client cache as base of delta encoding.

11. A system comprising:
    a proxy server comprising a processor and a database, the proxy server constructed and arranged to:
    receive request data associated with a URL;
    store the request data in the database;
    receive a request for the URL from a client;
    identify commonly requested data in the request data;
    receive client cache data from the client;

determine whether the commonly requested data is in the client cache data;

when the commonly requested data is not in the client cache data, send the commonly requested data to the client before receiving a request for the commonly requested data from the client;

receive an indication from the client that the commonly requested data was not needed; and store the indication in the database so that the commonly requested data will no longer be sent in response to a request for the URL.

12. The system of claim 11, wherein the commonly requested data comprises data requested as a result of a script execution by the client.

13. The system of claim 12, wherein the script is a JavaScript element.

14. The system of claim 11, wherein the commonly requested data is associated with a different URL from the URL.

15. The system of claim 11, wherein the data is compressed and delta encoded with a client cache as a base of delta encoding.

16. The system of claim 11, wherein the proxy server is further constructed and arranged to synchronize a client cache with a proxy server cache.

17. The system of claim 16, wherein the synchronizing comprises:

receiving client cache data from the client; and storing the client cache data in the database.

18. The system of claim 11, wherein the proxy server is further constructed and arranged to synchronize a client cookie with a proxy server cookie.

19. The system of claim 18, wherein the synchronizing comprises:

receiving client cookie data from the client; and storing the client cookie data in the database.

20. The system of claim 18, wherein:

the proxy server is further constructed and arranged to receive verification that the client cookie data matches the server cookie data; and when the client cookie data does not match the server cookie data, the commonly requested data is fetched directly from a web server.

\* \* \* \* \*